United States Patent [19]

Kirbach

[11] Patent Number: 4,926,917
[45] Date of Patent: May 22, 1990

[54] FEED SPEED AND GUIDE ARM CONTROL FOR SAWING LOGS

[76] Inventor: Eberhard Kirbach, 10260 Dennis Crescent, Richmond, British Columbia, Canada, V7A 3R8

[21] Appl. No.: 377,096
[22] Filed: Jul. 10, 1989
[51] Int. Cl.⁵ .............................................. B27B 1/00
[52] U.S. Cl. .................................... 144/356; 83/76.8; 83/364; 83/367; 144/378; 250/560
[58] Field of Search ............... 83/76.6, 76.7, 76.8, 83/364, 365, 367; 144/356, 357, 376, 378, 3 R; 250/560, 561

[56] References Cited

U.S. PATENT DOCUMENTS

| | | | |
|---|---|---|---|
| 3,459,246 | 8/1969 | Ottosson | 144/3 R |
| 3,842,874 | 10/1974 | Noriyuki et al. | 144/3 R |
| 3,897,156 | 7/1975 | Chasson | 144/357 |
| 4,139,035 | 2/1979 | Bystedt et al. | 144/357 |
| 4,458,567 | 7/1984 | Tuomaala | 144/378 |
| 4,737,031 | 4/1988 | Mahlberg et al. | 144/357 |

FOREIGN PATENT DOCUMENTS 8601590 3/1986 PCT Int'l Appl.
507438 9/1976 U.S.S.R. ............................ 144/378

Primary Examiner—W. Donald Bray

[57] ABSTRACT

A feed speed control for band saws avoids overfeeding and underfeeding of logs or cants to allow higher initial input feeds and takes into account varying cutting depth throughout a log or cant length. The method comprises the steps of positioning a log or cant in preparation for sawing in a saw line, projecting a first light line onto the surface of the log or cant at the projected saw entry line, and a second light line onto the surface of the log or cant at the projected saw exit line and the second light line to determine depth of cut, and controlling the feed speed of the log or cant during the sawing step past the saw blade, to a predetermined feed speed for the measured depth of cut to avoid overfeeding and underfeeding.

9 Claims, 1 Drawing Sheet

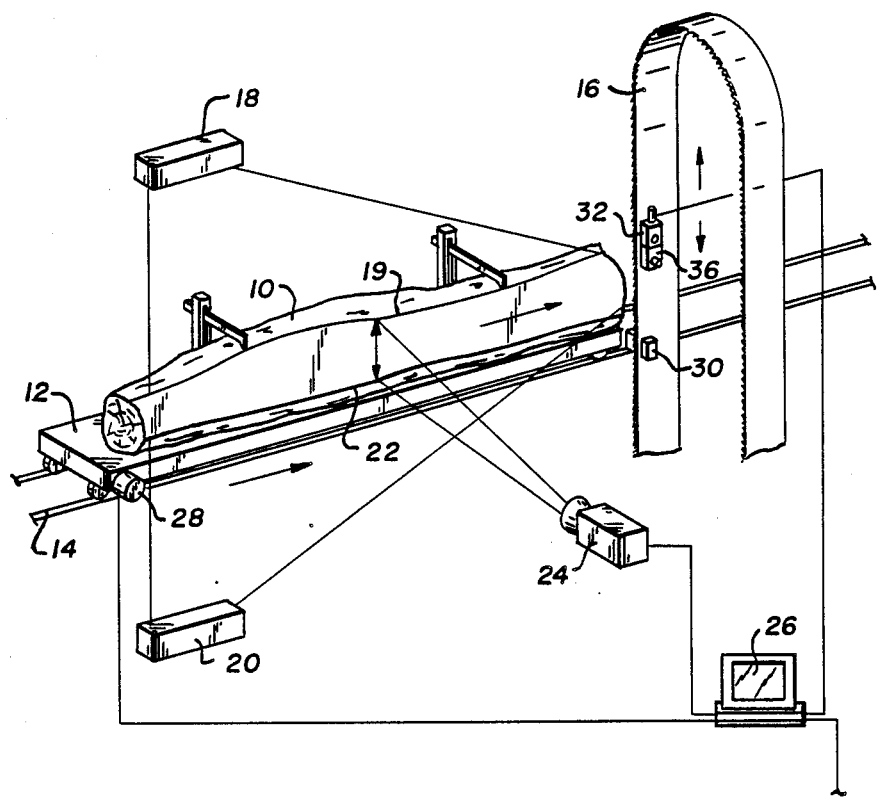

FEED SPEED AND GUIDE ARM CONTROL FOR SAWING LOGS

FIELD OF THE INVENTION

The present invention relates to feed speed control of band saws in a lumber mill and more specifically to avoiding overfeeding or underfeeding of logs or cants to band saws in a lumber mill.

DESCRIPTION OF THE PRIOR ART

In lumber mills, logs and cants are fed into a band saw generally on a carriage or other type of conveying system. Commonly, the feed speed of the carriage is manually controlled by using DC motor drives. A more advanced system of control regulates the feed speed by measuring power consumption of the band saw motor. Another technique is to measure saw blade deflection during sawing. Excessive deflection indicates the feed speed is too high or alternatively that the saw blade is dull. The most up to date system today is scanning the log for thickness and determining the cutting depth based on thickness and position of the saw in relation to the centre of the log.

Measuring power consumption of the band saw motor to control the feed speed takes into account the cutting forces that are generated by the saw blade and relates these saw blade deflection that may be due to overfeed or increasing dullness of the saw blade. Another factor that affects power consumption is the depth of cut. This varies dependent upon the size of the log or cant. It will be apparent that increased cutting depth requires a greater power consumption, and the problem with measuring only power consumption of the saw motor is that it does not distinguish between the different variables. Power consumption indicates sawing accuracy but is not sufficiently sensitive to indicate increased depth of cut, saw blade deflection caused by carriage misalignment, poor tooth fitting, excessive sawdust spillage, guide wear, cross-line of the band mill and poor tensioning or lumps in the saw blade itself.

Methods of monitoring sawing accuracy, measure the displacement or deflection of the saw blade during cutting. These monitoring devices are generally noncontact. Eddy current transducers and laser beams are examples of this technique. The methods are an improvement over the shortcomings encountered in using power consumption measurements, but they cannot predict saw blade deflection before the cut, only during the cut. Thus measurements can only be used to control feed speed when the saw blade is actually cutting. To avoid overfeeding the saw blade has to be entered into the cut cautiously and at a reasonably low feed speed and then the feed speed can be increased dependent upon the power consumption of the saw motor or vibration of the saw blade. This results in an initial time delay resulting in production losses for most cuts. Furthermore, the methods do not avoid overfeeding when the depth of cut changes suddenly due to irregularities along the log. Also these methods do not properly correct the feed speed in underfeeding situations, instead of increasing the feed speed, it is reduced, because in underfeeding situations excessive saw dust spillage may occur which leads to increased saw blade deflection and this may be interpreted as an overfeed situation then the speed is reduced still further.

Present day technology provides a system where logs are scanned for diameter and the log profile is used to control the feed speed. This method is suitable for sawing small logs or cants where saw cuts are performed close to the centre line of the log. However in sawing large logs the cutting depth of most cuts is considerably smaller than the log diameter, so the average feed speed based on diameter becomes too slow. In some more sophisticated systems the determination of the saw line in relation to the diameter of the log is determined but an assumption is made that the log is completely round, straight and with little taper or butt flare, which is very rarely correct. Many large first growth logs of softwoods and most hardwood logs have irregularities, thus in processing these logs the system does not give accurate feed speeds and often results in both overfeed and underfeed.

SUMMARY OF THE INVENTION

It is an aim of the present invention to provide a band saw for cutting logs advancing on a carriage or other type of conveying system which avoids over or underfeeding of the log into the band saw blade, and at the same time positions the saw blade entry guide for maximum blade support. Thus the log or cant is more accurately cut which allows reduction in target size and planer allowance, and consequently an increase in lumber yield. In the case of rough traded lumber much improved product quality is obtained because of dimensional accuracy. Furthermore, power consumption for the band saw motor is reduced.

It is a further aim to provide a feed speed control for a band saw which determines the feed speed prior to commencement of cutting. The system avoids placing initial stresses on the saw blade due to overfeed or underfeed.

The present invention provides a system wherein a log or cant is positioned on a carriage prior to sawing and a first light line and a second light line, representing saw entry and saw exit are projected from opposite surfaces of the log or cant on the proposed saw line. Thus the line is apparent on both surfaces of the log or cant and a camera positioned at the side of the log determines the distance between the two light lines which represents the depth of cut. This depth of cut is then used to control the feed speed of the log to the saw. Burls or other irregularities in the log which provide a sudden increase or decrease in the cutting depth are measured by the camera and when cutting commences the feed speed is controlled to increase or decrease to take into account these irregularities and thus cut a log at the most efficient feed speed for the particular depth of cut.

The distance between the light lines is processed with a microprocessor which produces a signal for a DC drive to the variable speed carriage containing the log or cant. The system avoids underfeeding which other systems such as measuring power consumption or saw bade deflection do not detect as such. Underfeeding causes spillage which results in increased friction and heating of the edge of the saw blade thus saw blade deflection is increased. In a preferred embodiment a transducer is positioned at a suitable location to measure saw blade deflection. Since the system accurately controls the feed extensive deflection of the saw blade is an indication of dull teeth in the saw blade or other problems associated with the saw. These problems are shown by means of an indicator, such as a light, so the operator knows that the saw blade needs attention.

In another embodiment the signal representing saw depth distance is used to control the position of the saw blade entry guide which is mounted on the guide arm. The saw blade guides are positioned as close as possible to the log or cant in order to obtain maximum support for the saw blade during the sawing step. In deep cuts the saw blade entry guide is moved away to avoid the log or cant and in shallower cuts the saw blade guide is moved towards the log.

The present invention provides a method of controlling feed speed of a log or cant while sawing with a saw blade, comprising the steps of positioning a log or cant in preparation for sawing in a saw line on the log or cant, projecting a first light line onto the surface of the log or cant at the projected saw entry line, and a second light line onto the surface of the log or cant at the projected saw exit line, measuring the distance between the first light line and second light line on the log or cant to determine depth of cut, and controlling the feed speed of the log or cant past the saw blade during the sawing step to a predetermined feed speed for the measured depth of cut to avoid overfeed and underfeed.

In a further embodiment of the invention there is provided an apparatus for controlling feed speed of a log or cant while sawing with a saw blade, comprising means for supporting a log or cant prior to sawing along a saw line, projection means for projecting a first light line onto the surface of the log or cant at a saw entry of a projected saw line, and a second light line onto the surface of the log or cant at a saw exit of a projected saw line, camera means to measure the projected depth of cut between the first light line and the second light line, and control means to control feed speed of the log or cant past the saw blade during the sawing at a predetermined feed speed for the measured depth of cut to avoid overfeed and underfeed.

DRAWINGS OF THE INVENTION

In drawings which illustrate embodiments of the invention:

A schematic drawing illustrates a log or cant positioned on a carriage in preparation for sawing in accordance with one embodiment of the present invention.

DESCRIPTION OF THE PREFERRED EMBODIMENT

Referring now to the drawing a log or cant 10 is shown on a carriage 12 which may move on rails 14 past a band saw 16. A top light line lamp 18 is positioned on the saw line and projects a top light line 19 which extends along the surface of the log or cant 10 representing the saw entry of the projected saw cut. A bottom light 20 positioned beneath the log 10 projects a lower light line 22 which represents the saw exit of the projected saw cut line. Thus the two lamps 18 and 20 project light lines 19 and 22 which represent the saw entry and saw exit of the saw cut. A camera 24 positioned at the side of the log is arranged to measure the distance between the two light lines 19 and 22. This distance represents the depth of cut for the log or cant. While the drawing illustrates the band saw 16 cutting vertically, in some sawmills, the band saw can cut horizontally and the carriage 12 is arranged to hold the log or cant 10 for a horizontal cut. In such a case, the light lines 19 and 22 are on each side of the log representing saw entry and saw exit.

The light line lamps 18 and 20 may be laser projectors, which project a light line in a variety of colours to suit the requirement and preference of the user.

A signal from the camera 24 representing depth of cut is fed to a micro processor 26 which produces a signal to a DC drive 28 on the carriage 12 to set the speed of the carriage 12 and thus the feed speed for the log. The desired feed speed for the carriage for a particular depth of cut is known, and the micro processor 26 provides a signal to the carriage motor 28 to provide the correct speed for feeding the log 10 past the saw blade 16. The camera 24 scans the log to determine the depth of cut along the log and the micro processor then controls the feed speed of the carriage 12. Variations in depth of cut due to burls, tapers, sweeps or other differences in the log provide variation in carriage speed so that the most efficient feed speed is provided for the sawing step and neither an overfeed or underfeed occurs throughout the sawing step.

Bottom saw blade guides 30 are at a fixed height and do not move, however the top saw blade guide 32 is mounted on an upper guide arm (not shown) allowing the top saw blade guide 32 to move up and down. Thus when the top light line, or saw entry line 19 is determined by the camera 24, the signal from the camera to the micro processor 26 also provides a further signal to set the height of the top saw blade guide 32 just above the top of the light line 19. If there is a variation in the height of this light line 19 then the top blade guide 32 will move up and down so that it is close to the top of the log or cant 10 without interfering with the cut thus providing maximum support for the saw blade 16.

A transducer monitor 36 is illustrated just beneath the top saw blade guide 32 to measure the deflection of the saw blade and indicate to the sawyer if the deflection of the saw blade exceeds a predetermined amount in which case the sawyer will know that the blade has to be changed or other conditions are affecting the cut. The signal from the transducer 36 may either be used to stop feeding the log 10 or alternatively can be linked to a light indicator.

In operation a sawyer positions a log or cant 10 onto the carriage 12 and the light lines 19 and 22 indicate to the sawyer where the saw cut is going to occur. If he finds that this cut does not appear to provide maximum yield or the best wood grade, from a log 10 then he can easily correct the orientation of the log 10 for the best cutting position. Once the position of the log 10 has been set and the log clamped, the depth of cut is scanned along the length of the log 10, the sawyer commences the sawing operation and the feed speed for the log 10 is set by means of the camera 24 determining depth of cut which sets the initial speed prior to the entry of the saw blade 16 into the log 10. Thus it is not necessary to start the sawing step at a slow speed as in previous systems wherein the log speed can only be set once the sawing step has started and the information for determining speed is taken from the power to the band saw motor or alternatively deflection of the blade while sawing.

Furthermore the top saw blade guide 32 is positioned automatically from the micro processor 26 without having to have the sawyer manually adjust the position of the guide 32. If the saw bade 16 has been damaged due to metal or rocks in a previous cut, or due to silt present in the log, and excessive deflection of the saw blade 16 occurs, then the deflection monitor 36 activates a light or stops the movement of the carriage 12 allowing the saw blade to be changed.

Various changes may be made to the embodiments disclosed herein without departing from the scope of the present invention which is limited only by the following claims.

The embodiments of the present invention in which an exclusive property or privilege is claimed are defined as follows:

1. A method of controlling feed speed of a log or cant while sawing with a saw blade, comprising the steps of,
    positioning a log or cant in preparation for sawing in a saw line on the log or cant,
    projecting a first light line onto the surface of the log or cant at the projected saw entry line, and a second light line onto the surface of the log or cant at the projected saw exit line,
    measuring the distance between the first light line and the second light line on the log or cant to determine depth of cut, and
    controlling the feed speed of the log or cant past the saw blade during the sawing step, to a predetermined feed speed for the measured depth of cut to avoid overfeed and underfeed.

2. The method according to claim 1 wherein a saw blade entry guide assembly is provided with a variable location, and including the steps of positioning the saw blade entry guide assembly dependent upon the position of the first light line.

3. The method according to claim 1 wherein the first light line and the second light line are formed by light line projectors.

4. The method according to claim 1 wherein the feed speed varies throughout the sawing step in accordance with variation in depth of cut along the log or cant.

5. The method according to claim 4 wherein the cutting depth is determined in front of the saw blade.

6. An apparatus for controlling feed speed of a log or cant while sawing with a saw blade, comprising
    means for supporting a log or cant prior to sawing along a saw line,
    projection means for projecting a first light line onto the surface of the log or cant at a saw entry of a projected saw line, and a second light line onto the surface of the log or cant at a saw exit of a projected saw line,
    camera means to measure the projected depth of cut between the first light line and the second light line, and
    control means to control feed speed of the log or cant past the saw blade during the sawing step at a predetermined feed speed for the measured depth of cut to avoid overfeed and underfeed.

7. The apparatus according to claim 6 wherein the projection means for projecting the first light line and the second light line are laser light line projectors.

8. The apparatus according to claim 6 including a moveable saw blade entry guide assembly, and including means to move the assembly relative to the saw blade dependent upon the position of the first light line relative to the means for supporting the log or cant.

9. The apparatus according to claim 6 including a displacement probe transducer means to measure excessive saw blade displacement during the sawing step.

* * * * *